United States Patent
Bai et al.

(10) Patent No.: US 12,399,302 B2
(45) Date of Patent: Aug. 26, 2025

(54) DISPLAY PANEL WITH ANTI-REFLECTIVE LAYER AND DISPLAY DEVICE

(71) Applicant: Shenzhen China Star Optoelectronics Semiconductor Display Technology Co., Ltd., Guangdong (CN)

(72) Inventors: Xue Bai, Guangdong (CN); Miao Zhou, Guangdong (CN)

(73) Assignee: SHENZHEN CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 522 days.

(21) Appl. No.: 17/790,236

(22) PCT Filed: Jun. 24, 2022

(86) PCT No.: PCT/CN2022/100957
§ 371 (c)(1),
(2) Date: Jun. 30, 2022

(87) PCT Pub. No.: WO2023/216381
PCT Pub. Date: Nov. 16, 2023

(65) Prior Publication Data
US 2023/0417952 A1   Dec. 28, 2023

(30) Foreign Application Priority Data
May 7, 2022   (CN) ............ 202210494397.9

(51) Int. Cl.
*G02B 1/11*   (2015.01)

(52) U.S. Cl.
CPC ................. *G02B 1/11* (2013.01)

(58) Field of Classification Search
CPC ... G02B 1/11; G02B 1/00; G02B 1/04; G02B 1/10; G02B 1/111; G02B 5/02;
(Continued)

(56) References Cited

U.S. PATENT DOCUMENTS

2007/0146887 A1   6/2007   Ikeda
2019/0243042 A1*  8/2019   Wee ............... G02B 5/305
2022/0365257 A1*  11/2022  Kim ............... B32B 7/12

FOREIGN PATENT DOCUMENTS

CN   1503009 A    6/2004
CN   102472841 A  5/2012
(Continued)

OTHER PUBLICATIONS

International Search Report in International application No. PCT/CN2022/100957, mailed on Feb. 6, 2023.
(Continued)

*Primary Examiner* — Arnel C Lavarias
(74) *Attorney, Agent, or Firm* — Rivka Friedman

(57) ABSTRACT

A display panel and a display device are provided. The display panel includes a panel main body and an anti-reflective layer disposed on a light-emitting surface of the panel main body. The anti-reflective layer includes an anti-reflective functional layer and a haze adhesive layer disposed between the anti-reflective functional layer and the panel main body, and the haze adhesive layer is an organic adhesive layer doped with first scattering particles.

18 Claims, 3 Drawing Sheets

(58) Field of Classification Search
CPC .. G02B 5/0236; G02B 5/0242; G02B 5/0273; G02B 5/0278; G02B 5/0294; G02B 5/28; G02B 5/285; G02B 5/286; G02B 5/287; G02B 27/0018; G02F 1/133502; G02F 1/133504; G02F 1/133507; B32B 27/00; B32B 27/18; B32B 27/20; B32B 37/12; B32B 2307/00; B32B 2307/40; B32B 2307/408
USPC ....... 359/601, 599, 577, 580, 586, 588, 589, 359/590, 609; 362/606, 607; 349/112; 428/221, 323
See application file for complete search history.

(56) References Cited

FOREIGN PATENT DOCUMENTS

| | | | |
|---|---|---|---|
| CN | 102483475 | A | 5/2012 |
| CN | 109946774 | A | 6/2019 |
| CN | 111200076 | A | 5/2020 |
| CN | 113193014 | A | 7/2021 |
| CN | 113296312 | A | 8/2021 |
| JP | 2004326005 | A | 11/2004 |
| JP | 2009122481 | A | 6/2009 |
| JP | 2009244623 | A | 10/2009 |
| TW | 201213886 | A1 * | 4/2012 |
| WO | 2011162184 | A1 | 12/2011 |

OTHER PUBLICATIONS

Written Opinion of the International Search Authority in International application No. PCT/CN2022/100957, mailed on Feb. 6, 2023.

Chinese Office Action issued in corresponding Chinese Patent Application No. 202210494397.9 dated Apr. 26, 2023, pp. 1-8.

* cited by examiner

DISPLAY PANEL WITH ANTI-REFLECTIVE LAYER AND DISPLAY DEVICE

FIELD OF INVENTION

The present disclosure relates to the field of display technologies, and more particularly, to a display panel and a display device.

BACKGROUND OF INVENTION

With high-end and diversification of products in display markets, performance requirements of display devices are gradually increasing. Under conditions of strong outdoor and indoor light, when viewing displays, strong glare will be generated, which will hurt human eyes for a long time. For environments such as museums or classrooms, glare will interfere with visions, which will reduce the value of exhibits or reduce teaching efficiency. The above problems can be improved by using anti-glare films. However, problems caused by the anti-glare films, such as white screens, will still reduce visibility and optical performances of the displays. A surface thereof needs to be used with anti-reflective films simultaneously, which can greatly improve display performances, thereby improving a visual effect of the displays, and improving a value of the displays themselves.

At present, commonly used anti-glare films usually achieve the anti-glare effect by providing an uneven surface. This makes it difficult to prepare the anti-reflective films disposed on the anti-glare films, and the thickness uniformity of formed anti-reflective films is poor, thereby resulting in a poor anti-reflective effect.

Technical problem: the present disclosure provides a display panel and a display device. The display panel can realize a relatively low reflectance index and a high transmittance at a same time while ensuring a certain haze.

SUMMARY OF INVENTION

In order to solve the above problems, in a first aspect, the present disclosure provides a display panel. The display panel includes:
 a panel main body; and
 an anti-reflective layer disposed on a light-emitting surface of the panel main body.
 Wherein, the anti-reflective layer includes an anti-reflective functional layer and a haze adhesive layer disposed between the anti-reflective functional layer and the panel main body, and the haze adhesive layer is an organic adhesive layer doped with first scattering particles.

In the display panel provided in an embodiment of the present disclosure, the first scattering particles include inorganic scattering particles and/or organic scattering particles; the inorganic scattering particles include silicon oxide particles, titanium oxide particles, aluminum oxide particles, zinc oxide particles, tin oxide particles, calcium carbonate particles, barium sulfate particles, calcium sulfate particles, or silicon powder; and the organic scattering particles include polycarbonate particles, poly(methyl methacrylate) particles, polystyrene particles, polyethylene particles, polyamide particles, polyimide particles, or ethylene-tetrafluoroethylene copolymer particles. A material of the organic adhesive layer is a pressure-sensitive adhesive or an ultraviolet-curing adhesive.

In the display panel provided in an embodiment of the present disclosure, a particle size of the first scattering particles ranges from 500 nm to 2 µm.

In the display panel provided in an embodiment of the present disclosure, a content of the first scattering particles in the haze adhesive layer ranges from 5 wt % to 30 wt %.

In the display panel provided in an embodiment of the present disclosure, a thickness of the haze adhesive layer ranges from 3 µm to 10 µm.

In the display panel provided in an embodiment of the present disclosure, a surface of the haze adhesive layer away from the panel main body is further provided with a planarization adhesive layer.

In the display panel provided in an embodiment of the present disclosure, the planarization adhesive layer is doped with second scattering particles, and a particle size of the second scattering particles is less than a particle size of the first scattering particles.

In the display panel provided in an embodiment of the present disclosure, an adhesive layer is disposed between the anti-reflective functional layer and the haze adhesive layer.

In the display panel provided in an embodiment of the present disclosure, a refractive index of the adhesive layer is greater than a refractive index of the anti-reflective functional layer.

In the display panel provided in an embodiment of the present disclosure, a material of the planarization adhesive layer is a pressure-sensitive adhesive or an ultraviolet-curing adhesive.

In the display panel provided in an embodiment of the present disclosure, one side of the haze adhesive layer adjacent to the panel main body is further provided with a substrate layer.

In a second aspect, the present disclosure provides a display device, which includes a display panel. The display panel includes:
 a panel main body; and
 an anti-reflective layer disposed on a light-emitting surface of the panel main body.
 Wherein, the anti-reflective layer includes an anti-reflective functional layer and a haze adhesive layer disposed between the anti-reflective functional layer and the panel main body, and the haze adhesive layer is an organic adhesive layer doped with first scattering particles.

In the display device provided in an embodiment of the present disclosure, the first scattering particles include inorganic scattering particles and/or organic scattering particles; the inorganic scattering particles include silicon oxide particles, titanium oxide particles, aluminum oxide particles, zinc oxide particles, tin oxide particles, calcium carbonate particles, barium sulfate particles, calcium sulfate particles, or silicon powder; and the organic scattering particles include polycarbonate particles, poly(methyl methacrylate) particles, polystyrene particles, polyethylene particles, polyamide particles, polyimide particles, or ethylene-tetrafluoroethylene copolymer particles. A material of the organic adhesive layer is a pressure-sensitive adhesive or an ultraviolet-curing adhesive.

In the display device provided in an embodiment of the present disclosure, a particle size of the first scattering particles ranges from 500 nm to 2 µm.

In the display device provided in an embodiment of the present disclosure, a content of the first scattering particles in the haze adhesive layer ranges from 5 wt % to 30 wt %.

In the display device provided in an embodiment of the present disclosure, a thickness of the haze adhesive layer ranges from 3 µm to 10 µm.

In the display device provided in an embodiment of the present disclosure, a surface of the haze adhesive layer away from the panel main body is further provided with a planarization adhesive layer.

In the display device provided in an embodiment of the present disclosure, the planarization adhesive layer is doped with second scattering particles, and a particle size of the second scattering particles is less than a particle size of the first scattering particles.

In the display device provided in an embodiment of the present disclosure, an adhesive layer is disposed between the anti-reflective functional layer and the haze adhesive layer.

In the display device provided in an embodiment of the present disclosure, a refractive index of the adhesive layer is greater than a refractive index of the anti-reflective functional layer.

Beneficial effect: the present disclosure provides the display panel and the display device. The display panel includes the panel main body and the anti-reflective layer disposed on the light-emitting surface of the panel main body. Wherein, the anti-reflective layer includes the anti-reflective functional layer and the haze adhesive layer disposed between the anti-reflective functional layer and the panel main body, and the haze adhesive layer is the organic adhesive layer doped with the first scattering particles. That is, the haze adhesive layer is added between a conventional anti-reflective functional layer and the panel main body, and a desired haze value is realized by doping scattering particles in the haze adhesive layer, thereby allowing the haze adhesive layer to have a flat surface. In this way, a formation process of the anti-reflective functional layer disposed on the haze adhesive layer is simple, and the anti-reflective functional layer formed thereon has a high uniformity of film thickness, thereby realizing a better anti-reflective effect. By combining the haze adhesive layer with the anti-reflective functional layer, the display panel can realize a relatively low reflectance index and a high transmittance at a same time while ensuring a certain haze.

DETAILED DESCRIPTION OF PREFERRED EMBODIMENTS

Figure 1:
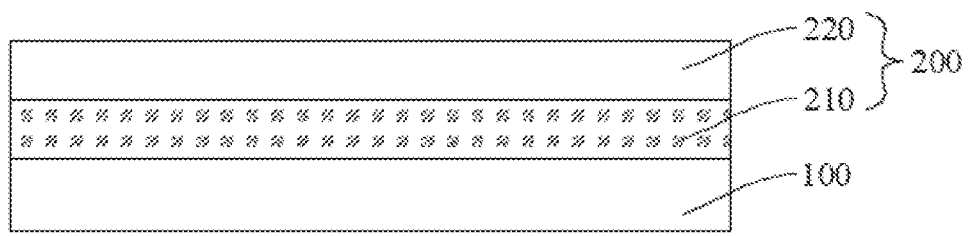
FIG. 1 is a schematic cross-sectional structural diagram of a display panel according to a first embodiment of the present disclosure.

The embodiments of the present disclosure are described in detail hereinafter. Examples of the described embodiments are given in the accompanying drawings. The specific embodiments described with reference to the attached drawings are all exemplary and are intended to illustrate and interpret the present disclosure. Based on the embodiments in the present disclosure, all other embodiments obtained by those skilled in the art without creative efforts are within the scope of the present disclosure.

In the description of the present disclosure, it should be understood that terms such as "center", "longitudinal", "lateral", "length", "width", "thickness", "upper", "lower", "front", "rear", "left", "right", "vertical", "horizontal", "top", "bottom", "inside", "outside", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or implicitly indicating the number of technical features indicated. Thus, features limited by "first" and "second" are intended to indicate or imply including one or more than one these features. In the description of the present disclosure, "a plurality of" relates to two or more than two, unless otherwise specified.

In this disclosure, the word "exemplary" is used to mean "serving as an example, illustration, or description". Any embodiment described as "exemplary" in this disclosure is not necessarily to be construed as a preferred or an advantageous embodiment over other embodiments. In order to enable any person skilled in the art to implement and use the present disclosure, the description is given as follows. In the following description, details are set forth for the purpose of explanation. It should be understood by one of ordinary skill in the art that the present disclosure may be implemented without use of these specific details. In other embodiments, well-known structures and procedures are not described in detail to avoid obscuring the description of the present disclosure with unnecessary details. Accordingly, the present disclosure is not intended to be limited to the embodiments shown but is to be accorded the widest scope consistent with the principles and features disclosed herein.

An embodiment of the present disclosure provides a display panel. The following describes the display panel in detail in conjunction with the cross-sectional structure of the display panel shown in FIG. 1.

The display panel includes a panel main body 100 and an anti-reflective layer 200 disposed on a light-emitting surface of the panel main body 100. Wherein, the anti-reflective layer 200 includes an anti-reflective functional layer 220 and a haze adhesive layer 210 disposed between the anti-reflective functional layer 220 and the panel main body 100, and the haze adhesive layer 210 is an organic adhesive layer doped with first scattering particles.

The haze adhesive layer 210 is added between a conventional anti-reflective functional layer 220 and the panel main body 100, a desired haze value is realized by doping scattering particles in the haze adhesive layer 210, that is, the haze adhesive layer 210 has a higher inner haze and a lower outer haze, thereby allowing the haze adhesive layer 210 to have a flat surface. In this way, a formation process of the anti-reflective functional layer 220 disposed on the haze adhesive layer 210 is simple, and the anti-reflective functional layer 220 formed thereon has a high uniformity of film thickness, thereby realizing a better anti-reflective effect. By combining the haze adhesive layer 210 with the anti-reflective functional layer 220, the display panel can realize a relatively low reflectance index and a high transmittance at a same time while ensuring a certain haze. Specifically, it has been verified that the haze of the anti-reflective layer 200 can reach more than 30% while the reflectivity can be reduced to about 1.5%.

Wherein, the panel main body is a main structure for realizing display, and a display type of the panel main body is not limited, and may be a liquid crystal display type, an organic light-emitting type, a micro-light-emitting diode type, etc.

Figure 2:
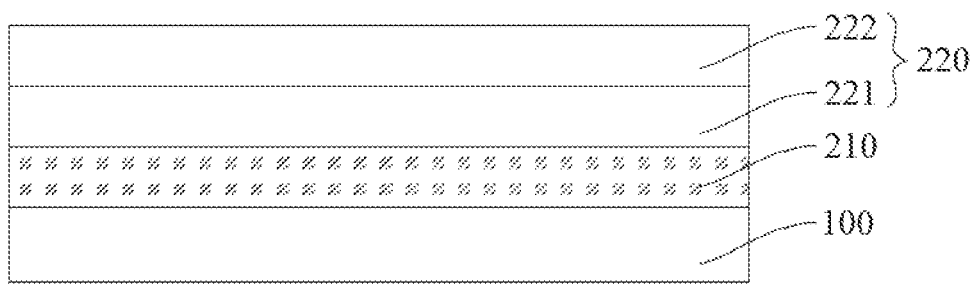
FIG. 2 is a schematic cross-sectional structural diagram of the display panel according to a second embodiment of the present disclosure.

The anti-reflective functional layer 220 is a conventional film layer that reduces reflectivity, and may be a single-layered structure, as shown in FIG. 1. In some cases, in order to further reduce the reflectivity and improve a color shift problem caused by the single-layered anti-reflective functional layer 220, the anti-reflective functional layer 220 may also be disposed as a double-layered film structure. According to the Fresnel principle, a combination of different refractive index layers can form different types of reflection peaks, and reflection bands of each refractive index layer are different. Compared to a single-layered film layer, a reflection peak formed by a reasonable double-layered film layer covers a wider wavelength band than that of the single-layered film layer, thereby naturally reducing the reflectivity and improving the color shift. Referring to FIG. 2, the anti-reflective functional layer 220 includes a first anti-reflective functional sublayer 221 and a second anti-reflective functional sublayer 222 disposed on the haze adhesive layer 210 in sequence. At this time, a refractive index of the first anti-reflective functional sublayer 221 is greater than that of the second anti-reflective functional sublayer 222.

Specifically, when the anti-reflective functional layer 220 is a single-layered structure, the anti-reflective functional layer 220 is usually a low refractive index film layer.

When the anti-reflective functional layer 220 is a double-layered structure, the second anti-reflective functional sublayer 222 is usually a low refractive index film layer, and the first anti-reflective functional sublayer 221 may be a low refractive index film layer or a high refractive index film layer.

Further, a refractive index of the low refractive index film layer usually ranges from 1.1 to 1.45. Loose and porous membranes, or a low refractive index adhesive of mesoporous (hollow) particles containing binders may be coated to form membranes by a wet coating process, or may also be formed by magnetron sputtering, evaporation, or chemical vapor deposition. Wherein, preferably, the loose and porous membranes, or the low refractive index adhesive of mesoporous (hollow) particles containing binders may be mesoporous (hollow) silicon oxide resin balls or a loose and porous silicon oxide resin film prepared by sol-gel method. Wherein, the wet film-forming process includes precise surface coating processes, such as microgravure coating and slit coating.

A refractive index of the high refractive index film layer usually ranges from 1.5 to 1.7, and the high refractive index film layer is a mixture of a binder resin (a refractive index of the binder resin ranges from 1.45 to 1.6) and high refractive index particles. The high refractive index particles may be titanium oxide, zirconium oxide, tin oxide, zinc antimonate, zinc oxide, cerium oxide, aluminum oxide, tantalum oxide, or yttrium oxide, and zirconium oxide and/or titanium oxide is preferred.

In some embodiments, the first scattering particles may be inorganic scattering particles, organic scattering particles, or mixed scattering particles of the inorganic scattering particles and the organic scattering particles. Wherein, the inorganic scattering particles may be silicon oxide particles, titanium oxide particles, aluminum oxide particles, zinc oxide particles, tin oxide particles, calcium carbonate particles, barium sulfate particles, calcium sulfate particles, or silicon powder. The organic scattering particles may be polycarbonate particles, poly(methyl methacrylate) particles, polystyrene particles, polyethylene particles, polyamide particles, polyimide particles, or ethylene-tetrafluoroethylene copolymer particles. As an example, the first scattering particles are silicon oxide particles.

In addition, a material of the organic adhesive layer may be a pressure-sensitive adhesive, an ultraviolet-curing adhesive, or other conventional resin adhesives in the field, which is not specifically limited herein.

In some embodiments, a particle size of the first scattering particles ranges from 500 nm to 2 μm. Light scatters on the scattering particles, and an intensity and an angle of scattered light are related to the particle size of the scattering particles. The scattered light on the scattering particles having a large particle size has a stronger intensity and a smaller scattering angle, and the scattered light on the scattering particles having a small particle size has a weaker intensity and a larger scattering angle. According to optical tests, setting the particle size of the first scattering particles to range from 500 nm to 2 μm can allow the haze adhesive layer 210 to have higher haze value and light transmittance.

In some embodiments, a content of the first scattering particles in the haze adhesive layer 210 ranges from 5 wt % to 30 wt %, and a thickness of the haze adhesive layer 210 ranges from 3 μm to 10 μm.

In summary, by setting related process parameters of the haze adhesive layer 210, the haze adhesive layer 210 can satisfy required haze requirements and achieve the higher inner haze and lower outer haze, and a total haze value can reach 20% or more, while maintaining a high light transmittance.

Figure 3:
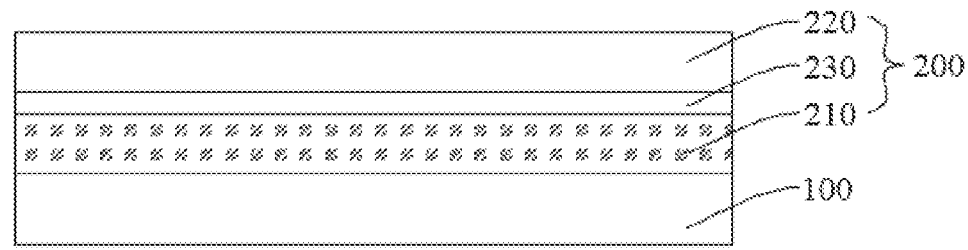
FIG. 3 is a schematic cross-sectional structural diagram of the display panel according to a third embodiment of the present disclosure.

In some embodiments, in order to further improve the flatness of the surface for disposing the anti-reflective functional layer 220, referring to FIG. 3, a surface of the haze adhesive layer 210 away from the panel main body 100 is further provided with a planarization adhesive layer 230. A material of the planarization adhesive layer 230 may be a pressure-sensitive adhesive or an ultraviolet-curing adhesive. Usually, the planarization adhesive layer 230 has a same material as the organic adhesive layer in the haze adhesive layer 210, and a difference is only that the planarization adhesive layer 230 is not doped with the scattering particles, thereby providing a flatter lower surface to the anti-reflective functional layer 220. Therefore, the uniformity of the film thickness of the anti-reflective functional layer 220 can be further improved, which can help the anti-reflective functional layer 220 to achieve lower reflectivity.

Figure 4:
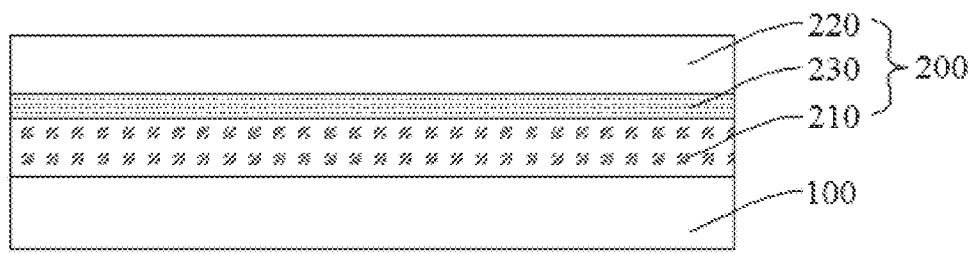
FIG. 4 is a schematic cross-sectional structural diagram of the display panel according to a fourth embodiment of the present disclosure.

Further, referring to FIG. 4, the planarization adhesive layer 230 is further doped with second scattering particles, and a particle size of the second scattering particles is set to be less than the particle size of the first scattering particles. Therefore, the flatness of an upper surface of the planarization adhesive layer 230 doped with the second scattering particles is better than the flatness of the upper surface of the haze adhesive layer 210, so that the flatness of the surface for disposing the anti-reflective functional layer 220 can still be improved in a certain degree. In addition, the planarization adhesive layer 230 is doped with the second scattering particles, so by combining the second scattering particles and the first scattering particles, the haze and light transmittance of the anti-reflective layer 200 can be further optimized. A material of the second scattering particles may or may not be the same as the first scattering particles.

Figure 5:
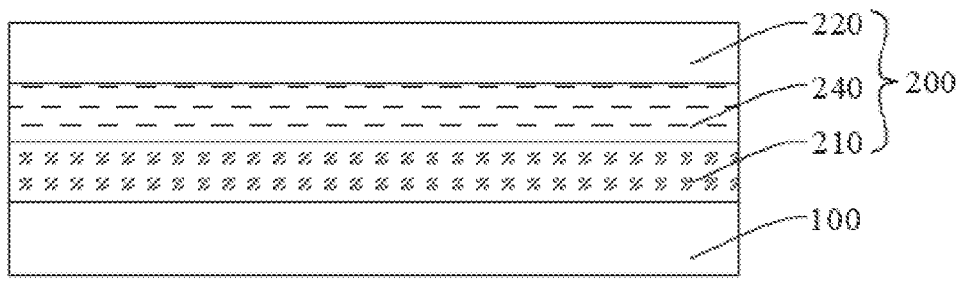
FIG. 5 is a schematic cross-sectional structural diagram of the display panel according to a fifth embodiment of the present disclosure.

In some embodiments, referring to FIG. 5, in order to increase the adhesion between the anti-reflective functional layer 220 and the haze adhesive layer 210, an adhesive layer 240 is disposed between the anti-reflective functional layer 220 and the haze adhesive layer 210. Further, by selecting the material of the adhesive layer 240, a refractive index of the adhesive layer 240 is set to be greater than the refractive index of the anti-reflective functional layer 220 disposed thereon. That is, on the basis of realizing the function of increasing the adhesion, by matching the adhesive layer 240 with the anti-reflective functional layer 220, the adhesive layer 240 can further reduce the reflectivity of the anti-reflective layer 200.

Specifically, when the anti-reflective functional layer 220 is a single-layered film layer, the refractive index of the adhesive layer 240 is greater than the refractive index of the anti-reflective functional layer 220.

When the anti-reflective functional layer 220 is a double-layered film layer, referring to FIG. 2, the anti-reflective functional layer 220 includes the first anti-reflective functional sublayer 221 and the second anti-reflective functional sublayer 222, and at this time, the refractive index of the adhesive layer 240 is greater than the refractive index of the first anti-reflective functional sublayer 221.

Figure 6:
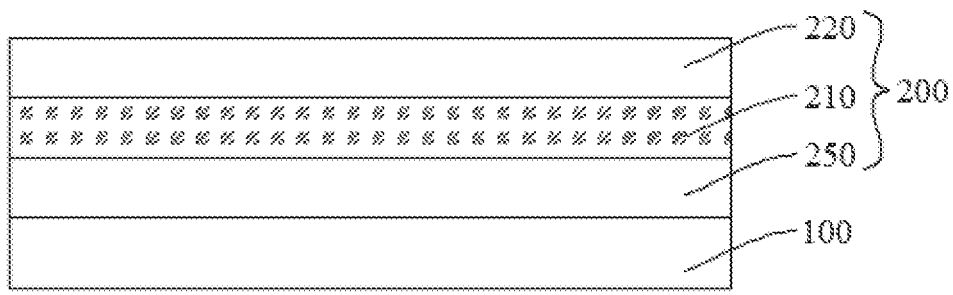
FIG. 6 is a schematic cross-sectional structural diagram of the display panel according to a sixth embodiment of the present disclosure.

In some embodiments, referring to FIG. 6, one side of the haze adhesive layer 210 adjacent to the panel main body 100 is further provided with a substrate layer 250. The substrate layer provides a certain supporting force for the haze adhesive layer 210 and the anti-reflective functional layer 220 that are disposed thereon. A material of the substrate layer 250 is usually a transparent resin material, such as polyethylene terephthalate, cellulose triacetate, poly(methyl methacrylate), polystyrene, polyethylene, polypropylene, polyvinyl chloride, polycarbonate, or polyamide.

Figure 7:
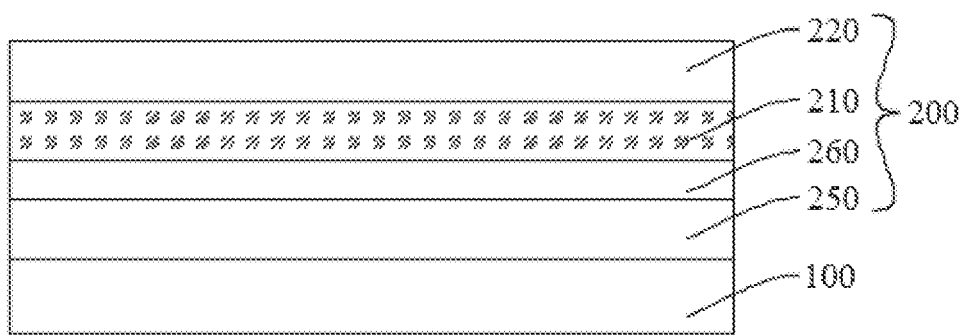
FIG. 7 is a schematic cross-sectional structural diagram of the display panel according to a seventh embodiment of the present disclosure.

Further, when a required refractive index cannot be obtained by matching the substrate layer 250 with upper film layers, referring to FIG. 7, one side of the substrate layer 250 away from the panel main body 100 may be further provided with a refractive index adjusting layer 260. By setting a refractive index of the refractive index adjusting layer 260, the reflectivity waveform of the anti-reflective layer 200 can be adjusted, thereby realizing a lower reflectivity.

It should be noted that only above structures are described in the above embodiments of the display panel, but it can be understood that in addition to the above structures, the display panel in the embodiments of the present disclosure can also include other necessary structures according to requirements, which are not specifically limited herein.

Another embodiment of the present disclosure further provides a display device, which includes the display panel in the above embodiments. The display device includes but is not limited to a mobile phone, a smart watch, a tablet computer, a notebook computer, a TV, etc.

In the above embodiments, the description of each embodiment has its own emphasis. For the parts that are not described in detail in an embodiment, refer to the detailed description of other embodiments above, which will not be repeated here.

The display panel and the display device provided by the embodiments of the present disclosure are described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A display panel, comprising:
  a panel main body; and
  an anti-reflective layer disposed on a light-emitting surface of the panel main body;
  wherein the anti-reflective layer comprises an anti-reflective functional layer and a haze adhesive layer disposed between the anti-reflective functional layer and the panel main body, and the haze adhesive layer is an organic adhesive layer doped with first scattering particles,
  wherein a surface of the haze adhesive layer away from the panel main body is further provided with a planarization adhesive layer.

2. The display panel according to claim 1, wherein the first scattering particles comprise inorganic scattering particles or organic scattering particles; the inorganic scattering particles comprise silicon oxide particles, titanium oxide particles, aluminum oxide particles, zinc oxide particles, tin oxide particles, calcium carbonate particles, barium sulfate particles, calcium sulfate particles, or silicon powder; and the organic scattering particles comprise polycarbonate particles, poly(methyl methacrylate) particles, polystyrene particles, polyethylene particles, polyamide particles, polyimide particles, or ethylene-tetrafluoroethylene copolymer particles, and a material of the organic adhesive layer is a pressure-sensitive adhesive or an ultraviolet-curing adhesive.

3. The display panel according to claim 1, wherein a particle size of the first scattering particles ranges from 500 nm to 2 μm.

4. The display panel according to claim 1, wherein a content of the first scattering particles in the haze adhesive layer ranges from 5 wt % to 30 wt %.

5. The display panel according to claim 1, wherein a thickness of the haze adhesive layer ranges from 3 μm to 10 μm.

6. The display panel according to claim 1, wherein the planarization adhesive layer is doped with second scattering particles, and a particle size of the second scattering particles is less than a particle size of the first scattering particles.

7. The display panel according to claim 1, wherein a material of the planarization adhesive layer is a pressure-sensitive adhesive or an ultraviolet-curing adhesive.

8. The display panel according to claim 1, wherein one side of the haze adhesive layer adjacent to the panel main body is further provided with a substrate layer.

9. A display device, comprising a display panel, wherein the display panel comprises:
  a panel main body; and
  an anti-reflective layer disposed on a light-emitting surface of the panel main body;
  wherein the anti-reflective layer comprises an anti-reflective functional layer and a haze adhesive layer disposed between the anti-reflective functional layer and the panel main body, and the haze adhesive layer is an organic adhesive layer doped with first scattering particles,
  wherein a surface of the haze adhesive layer away from the panel main body is further provided with a planarization adhesive layer.

10. The display device according to claim 9, wherein the first scattering particles comprise inorganic scattering particles or organic scattering particles; the inorganic scattering particles comprise silicon oxide particles, titanium oxide particles, aluminum oxide particles, zinc oxide particles, tin oxide particles, calcium carbonate particles, barium sulfate particles, calcium sulfate particles, or silicon powder; and the organic scattering particles comprise polycarbonate particles, poly(methyl methacrylate) particles, polystyrene particles, polyethylene particles, polyamide particles, polyimide particles, or ethylene-tetrafluoroethylene copolymer particles, and a material of the organic adhesive layer is a pressure-sensitive adhesive or an ultraviolet-curing adhesive.

11. The display device according to claim 9, wherein a particle size of the first scattering particles ranges from 500 nm to 2 μm.

12. The display device according to claim 9, wherein a content of the first scattering particles in the haze adhesive layer ranges from 5 wt % to 30 wt %.

13. The display device according to claim 9, wherein a thickness of the haze adhesive layer ranges from 3 μm to 10 μm.

14. The display device according to claim 9, wherein the planarization adhesive layer is doped with second scattering particles, and a particle size of the second scattering particles is less than a particle size of the first scattering particles.

15. A display panel, comprising:
a panel main body; and
an anti-reflective layer disposed on a light-emitting surface of the panel main body;
wherein the anti-reflective layer comprises an anti-reflective functional layer and a haze adhesive layer disposed between the anti-reflective functional layer and the panel main body, and the haze adhesive layer is an organic adhesive layer doped with first scattering particles,
wherein an adhesive layer is disposed between the anti-reflective functional layer and the haze adhesive layer.

16. The display panel according to claim 15, wherein a refractive index of the adhesive layer is greater than a refractive index of the anti-reflective functional layer.

17. The display device according to claim 9, wherein a material of the planarization adhesive layer is a pressure-sensitive adhesive or an ultraviolet-curing adhesive.

18. The display device according to claim 9, wherein one side of the haze adhesive layer adjacent to the panel main body is further provided with a substrate layer.

* * * * *